(12) United States Patent
Lavene et al.

(10) Patent No.: US 10,032,561 B2
(45) Date of Patent: Jul. 24, 2018

(54) THERMAL CONTROL FOR CAPACITOR

(71) Applicant: Electronic Concepts Inc., Eatontown, NJ (US)

(72) Inventors: Bernard Lavene, Ocean, NJ (US); Joseph Bond, Eatontown, NJ (US)

(73) Assignee: ELECTRONIC CONCEPTS INC., Eatontown, NJ (US)

( * ) Notice: Subject to any disclaimer, the term of this patent is extended or adjusted under 35 U.S.C. 154(b) by 454 days.

(21) Appl. No.: 14/736,970

(22) Filed: Jun. 11, 2015

(65) Prior Publication Data

US 2016/0365197 A1 Dec. 15, 2016

(51) Int. Cl.
| | | |
|---|---|---|
| H01G 9/00 | (2006.01) | |
| H01G 4/258 | (2006.01) | |
| H01G 9/06 | (2006.01) | |
| H01G 9/14 | (2006.01) | |
| H01G 9/15 | (2006.01) | |

(52) U.S. Cl.
CPC .......... *H01G 9/0003* (2013.01); *H01G 4/258* (2013.01); *H01G 9/06* (2013.01); *H01G 9/14* (2013.01); *H01G 9/151* (2013.01)

(58) Field of Classification Search
CPC ........ H01G 4/236–4/242; H01G 4/258; H01G 9/0003; H01G 9/06; H01G 9/14; H01M 10/60–10/617
See application file for complete search history.

(56) References Cited

U.S. PATENT DOCUMENTS

| | | | | |
|---|---|---|---|---|
| 2,186,842 | A | | 1/1940 | Scoville |
| 3,243,672 | A | | 3/1966 | Simonds et al. |
| 3,622,846 | A | * | 11/1971 | Reimers .................. H01G 2/08 165/104.26 |
| 3,656,035 | A | * | 4/1972 | Corman .................. H01G 2/08 165/104.33 |
| 4,264,943 | A | | 4/1981 | Anderson et al. |
| 4,312,023 | A | | 1/1982 | Frappart et al. |
| 5,187,030 | A | * | 2/1993 | Firmin ................ F28D 15/0275 429/120 |
| 5,673,168 | A | | 9/1997 | Efford et al. |
| 6,430,024 | B1 | * | 8/2002 | Gernert .................... H01G 2/08 361/302 |
| 6,830,098 | B1 | * | 12/2004 | Todd ................... F28D 15/0275 165/104.21 |
| 9,196,936 | B2 | * | 11/2015 | Dillmann .......... H01M 10/5004 |
| 2010/0304258 | A1 | * | 12/2010 | Chan .................... H01G 9/0003 429/433 |
| 2011/0032108 | A1 | * | 2/2011 | Lavene .................... H01G 2/14 340/593 |

(Continued)

FOREIGN PATENT DOCUMENTS

EP 1 028 439 A1 8/2000

*Primary Examiner* — Thienvu Tran
*Assistant Examiner* — Christopher Clark
(74) *Attorney, Agent, or Firm* — RatnerPrestia

(57) ABSTRACT

A heat pipe cooled capacitor includes a capacitor body having opposing first and second ends and an opening defined between the opposing ends. A first heat pipe is thermally and electrically connected to the first end of the capacitor body. A second heat pipe is positioned at least partially through the opening of the capacitor body. The second heat pipe is thermally connected to the second end of the capacitor body, and electrically isolated from the first heat pipe.

20 Claims, 4 Drawing Sheets

(56) References Cited

U.S. PATENT DOCUMENTS

| | | | | |
|---|---|---|---|---|
| 2013/0182372 A1* | 7/2013 | Shepard | ............... | H01G 2/08 |
| | | | | 361/307 |
| 2014/0154548 A1* | 6/2014 | Dillmann | ......... | H01M 10/5004 |
| | | | | 429/120 |
| 2014/0376149 A1* | 12/2014 | Lamorey | ............... | H05B 3/023 |
| | | | | 361/280 |
| 2015/0194714 A1* | 7/2015 | You | ............... | F28D 15/0233 |
| | | | | 429/120 |

* cited by examiner

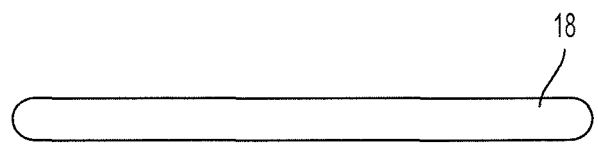
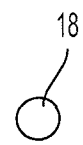
FIG. 7　　　　FIG. 8
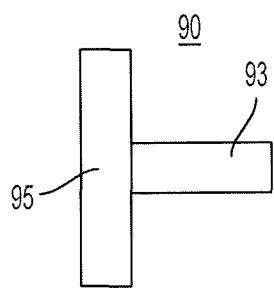
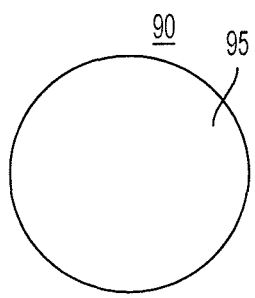
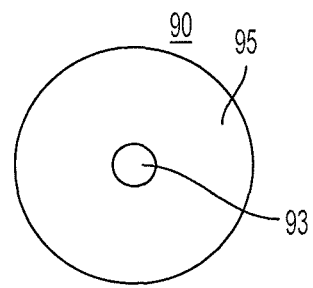
FIG. 9　　　　FIG. 10　　　　FIG. 11
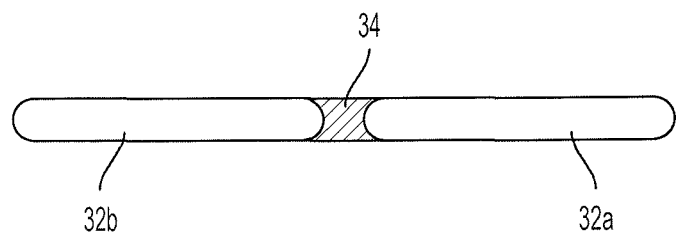
FIG. 12

THERMAL CONTROL FOR CAPACITOR

FIELD OF THE INVENTION

The invention relates generally to thermal control measures for cooling a capacitor, and more specifically to a capacitor which is cooled by a heat pipe.

BACKGROUND OF THE INVENTION

As is described in U.S. Pat. No. 6,430,024 to Gernert, which is incorporated by reference herein, the performance and lifespan of capacitors are detrimentally affected by increased temperature. Various devices have been developed to enhance the cooling of capacitors to prevent them from exceeding their maximum temperature.

There have been several efforts to remove heat from the center core of a cylindrical electrolytic capacitor casing. For example, U.S. Pat. No. 4,264,943 to Anderson uses a hollow core for the capacitor to increase the surface area exposed to the cooler outside environment. In U.S. Pat. No. 5,673,168 by Efford, it is suggested that such a hollow core capacitor casing be cooled by natural or forced convection of a fluid through the hollow core. U.S. Pat. No. 3,622,846 to Reimers discloses building a capacitor on a spool formed from three heat pipes, one as the center core, and the other two as flanges. Each of these references is also incorporated by reference herein in their entirety.

Improvements are continually sought for cooling capacitors in the interests of improving their performance and extending their lifespan.

SUMMARY OF THE INVENTION

Multiple examples of heat pipe cooled capacitors are disclosed herein.

According to one example, a heat pipe cooled capacitor comprises a capacitor body having opposing first and second ends and an opening defined between the opposing ends. A first heat pipe is thermally and electrically connected to the first end of the capacitor body. A second heat pipe is positioned at least partially through the opening of the capacitor body. The second heat pipe is thermally connected to the second end of the capacitor body, and electrically isolated from the first heat pipe.

According to another example, a heat pipe cooled capacitor comprises a capacitor body having opposing first and second ends and an opening defined between the opposing ends. A first heat pipe is thermally and electrically connected to the first end of the capacitor body. A first electrical terminal is thermally and electrically connected to the first heat pipe. A second heat pipe is positioned at least partially through the opening of the capacitor body, and thermally and electrically connected to the second end of the capacitor body. A second electrical terminal that is thermally and electrically connected to the second heat pipe.

According to yet another example, a heat pipe cooled capacitor comprises a capacitor body having opposing first and second ends and an opening defined between the opposing ends. A first heat pipe is thermally and electrically connected to the first end of the capacitor body. A first electrical terminal is thermally and electrically connected to the first heat pipe. A second electrical terminal is electrically connected to the second end of the capacitor body. A second heat pipe positioned at least partially through the opening of the capacitor body. The second heat pipe is thermally connected to the second end of the capacitor body and electrically isolated from the first electrical terminal and the second electrical terminal.

BRIEF DESCRIPTION OF THE DRAWING FIGURES

FIG. 7 depicts a side elevation view of a single post heat pipe.

FIG. 8 depicts a plan view of the single post heat pipe of FIG. 7.

FIG. 9 depicts a side elevation view of a disk-type heat pipe.

FIG. 10 depicts a top plan view of the disk-type heat pipe of FIG. 9.

FIG. 11 depicts a bottom plan view of the disk-type heat pipe of FIG. 9.

FIG. 12 depicts a side elevation view of a double post heat pipe.

DETAILED DESCRIPTION OF THE INVENTION

Figure 1:
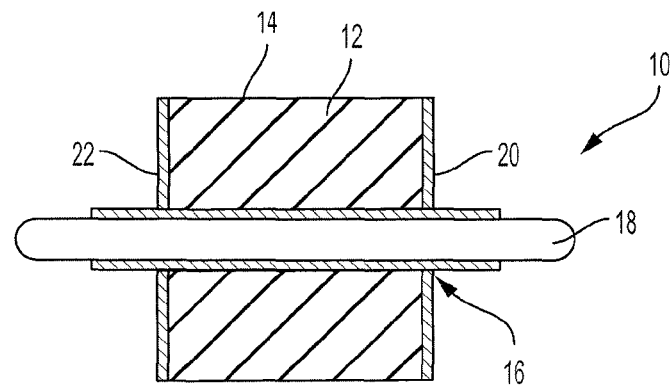
FIG. 1 depicts a schematic, cross-sectional view of a heat pipe cooled capacitor according to a first example of the invention.

FIG. 1 depicts a schematic, cross-sectional view of a heat pipe cooled capacitor 10 according to a first example of the invention. Capacitor 10 generally includes a capacitor body 14 comprising metal foil separated by insulation which is wrapped into one or more rolls 12 that form plates of capacitor 10. Rolls 12 may be conventional capacitor foil/insulation roll, or any other type of capacitive material. Capacitor 10 may have a circular shape in cross-section, or any other shape, such as square, for example.

Top and bottom plates 20 and 22 are mounted to the top and bottom surfaces, respectively, of the capacitor body 14. Top and bottom plates 20 and 22 are composed of an electrically conductive material, such as aluminum. Plates 20 and 22 are electrically isolated from each other. Although not shown, capacitor body 14 may be mounted within a cylinder, and top and bottom plates 20 and 22 may be mounted to the ends of the cylinder. The cylinder may be composed of an electrically insulative material to electrically isolate top and bottom plates 20 and 22 from each other.

Electrical terminations are provided on top and bottom plates 20 and 22. Alternatively, electrical terminations may be electrically isolated from each other on the same plate 20 or 22. Although not explicitly shown in FIG. 1, the electrical terminations may take the form of a lead wire, cable, stranded wire, lug, threaded stud or bushing, or other type of solder, braze, weld, bolt down, other any other means of electrical connection. The electrical terminations may be attached to the plates 20 and/or 22, or the electrical terminations may be plates 20 and 22 themselves.

In FIG. 1, capacitor 10 is cutaway to reveal a hollow tube 16 positioned in the center of body 14 and a heat pipe 18 that is positioned inside of tube 16. Tube 16 and heat pipe 18 pass through the longitudinal center of roll 12. The free ends of tube 16 extend past plates 20 and 22 and beyond the exterior of body 14 of capacitor 10. The free ends of heat pipe 18 extend past the free ends of tube 16. According to this example, the length of tube 16 is greater than the length of body 14, and the length of heat pipe 18 is greater than the length of tube 16.

Conventional thermally conductive epoxy may be used at the interface between tube 16 and heat pipe 18 to bond those components together. Although only one tube and one heat pipe are shown in FIG. 1, capacitor 10 may have any number of heat pipes wrapped in tubes. Alternatively, more than one heat pipe may be positioned in a tube.

Tube 16 is both electrically insulative and thermally conductive. Tube 16 electrically isolates heat pipe 18 from body 14 of capacitor 10, however, tube 16 conducts heat from body 14 of capacitor 10 to heat pipe 18. Alternatively, tube 16 is electrically insulative but not necessarily thermally conductive.

Tube 16 may be provided in many forms including, but not limited to, a shrink tube, a tape, a coating or a sheet, for example. Tube 16 may be formed from plastic, ceramic, an epoxy, a compound, a synthetic material, or any other material(s) known in the art having electrically insulative and thermally conductive properties, for example. Tube 16 may be formed by molding, machining, casting or a spray coating operation, for example.

Heat pipe 18 is a heat-transfer device that combines the principles of both thermal conductivity and phase transition to transfer thermal energy between two solid interfaces. More particularly, heat pipe 18 is provided for removing heat from capacitor 10 during operation in an effort to ensure that capacitor 10 operates below its maximum temperature rating. Additionally, heat pipe 18 may be configured to conduct heat into capacitor 10. For example, it may be useful to conduct heat into capacitor 10 using heat pipe 18 for a pre-heating operation, thermal control, enhanced reliability, or any other application that requires control of the internal capacitor temperature.

Various benefits of incorporating a heat pipe into a capacitor include: (i) increased current capacity and power density of the capacitor, (ii) increased reliability and lifespan of the capacitor, (iii) decreased weight, size and component count, (iv) decreased electrical loses, and (v) to provide a means positioned on the outside of a capacitor for measuring the internal capacitor temperature.

Heat pipe 18 may be any conventional heat pipe that is known to those skilled in the art. Suitable heat pipes may be disclosed in U.S. Pat. Nos. 2,186,842, 3,243,672, 3,622,846, 3,656,035, 4,312,023, 5,187,030 and 6,430,024, U.S. Patent App. Pub. No. 20130182372, and European Patent No. 1028439, each of which is incorporated by reference herein in its entirety for any and all purposes.

Side elevation and top plan views of heat pipe 18 are shown in FIGS. 7 and 8, respectively. The size and shape of heat pipe 18 may vary. For example, heat pipe 18 may have a square or hexagonal shape, as opposed to the circular cross-section shown in FIG. 8.

Figures 13A, 13B, 13C, 13D:
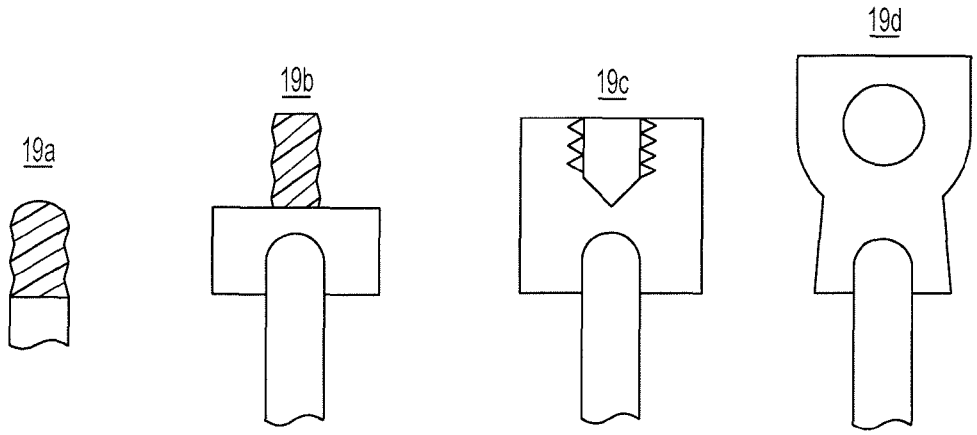
FIG. 13A depicts an elevation view of a heat pipe having a male threaded stud.
FIG. 13B depicts an elevation view of a heat pipe having a male threaded post.
FIG. 13C depicts an elevation view of a heat pipe having a female threaded bushing.
FIG. 13D depicts an elevation view of a heat pipe having a lug connector.

One or more ends of heat pipe 18 may include one of the mechanical terminations shown in FIGS. 13A-13D for connection to a heat sink or a temperature sensor, for example. FIG. 13A depicts an elevation view of a heat pipe having a male threaded stud 19*a*. FIG. 13B depicts an elevation view of a heat pipe having a male threaded post 19*b*. FIG. 13C depicts an elevation view of a heat pipe having a female threaded bushing 19*c*. Lastly, FIG. 13D depicts an elevation view of a heat pipe having a lug connector 19*d*.

In operation, heat is conducted from roll 12 to tube 16. Heat is also conducted from plates 20 and 22 to tube 16. Heat is then transferred from tube 16 to heat pipe 18. Heat pipe 18 carries the heat away from capacitor 10. Heat pipe 18 may be connected to a heat sink (not shown) for dissipating the heat, or it may be connected to a temperature sensor (not shown) for measuring the temperature of the capacitor, for example. Additionally, in operation, heat pipe 18 may configured to conduct thermal energy into capacitor 10 for the reasons that were discussed above.

Figure 2:
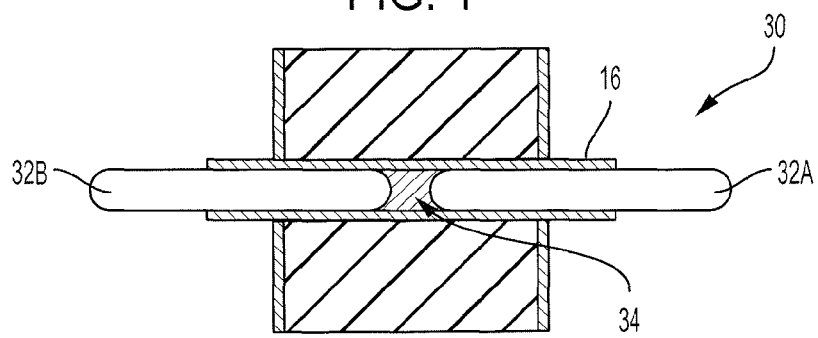
FIG. 2 depicts a schematic, cross-sectional view of a heat pipe cooled capacitor according to a second example of the invention.
Figure 3:
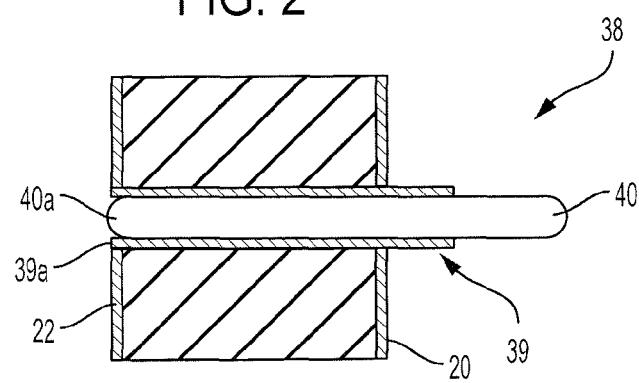
FIG. 3 depicts a schematic, cross-sectional view of a heat pipe cooled capacitor according to a third example of the invention.
Figure 4:
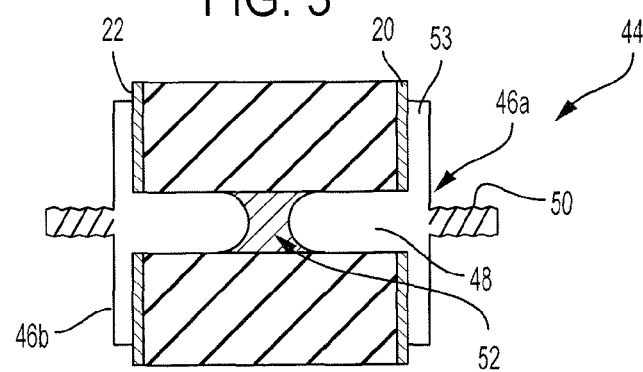
FIG. 4 depicts a schematic, cross-sectional view of a heat pipe cooled capacitor according to a fourth example of the invention.

FIGS. 2-4 depict alternative examples of capacitor 10, and only the differences between those alternative examples and the example shown in FIG. 1 will be described hereinafter.

FIG. 2 depicts a schematic, cross-sectional view of a heat pipe cooled capacitor 30 according to a second example of the invention. The capacitor 30 includes two separate heat pipes 32A and 32B that are each positioned within the tube 16 and electrically isolated from each other by an electrical isolator 34. A sub-assembly of heat pipes 32A and 32B and electrical isolator 34 is shown in FIG. 12. Like tube 16, electrical isolator 34 may come in many forms including, but not limited to, a shrink tube, a tape, a coating or a sheet, for example. Electrical isolator 34 may be formed from plastic, ceramic, an epoxy, a compound, a synthetic material, or any other material(s) known in the art having electrically insulative properties, for example. Electrical isolator 34 may be formed by molding, machining, casting or a spray coating operation, for example.

FIG. 3 depicts a schematic, cross-sectional view of a heat pipe cooled capacitor 38 according to a third example of the invention. The difference between capacitor 38 and capacitor 10 is that the end 39A of tube 39 and the end 40*a* of heat pipe 40 do not extend beyond plate 22. This example is useful where plate 22 is mounted directly to another component (e.g., a circuit board) and clearance is not available between plate 22 and the another component.

FIG. 4 depicts a schematic, cross-sectional view of a heat pipe cooled capacitor 44 according to a fourth example of the invention. Capacitor 44 is similar to capacitor 30 in that it has two separate heat pipes 46*a* and 46*b* that are electrically isolated by an electrical isolator 52. Capacitor 44 does not include an electrically insulative tube, like tube 16, because heat pipes 46*a* and 46*b* also serve as electrical terminations.

Figure 14:
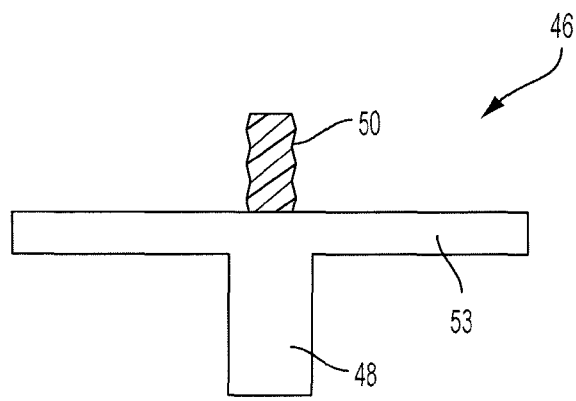
FIG. 14 depicts a side elevation view of a heat pipe having a male threaded post.
Figure 15:
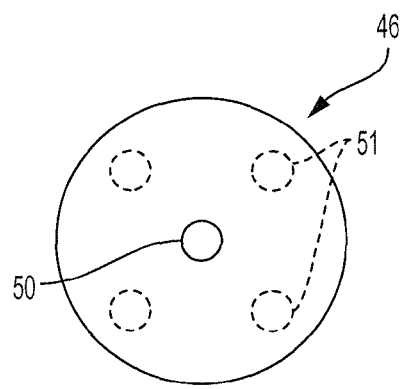
FIG. 15 depicts a top plan view of the heat pipe of FIG. 14.

Heat pipes 46*a* and 46*b* are referred to either collectively or individually as heat pipe(s) 46. Detailed views of heat pipe 16 are shown in FIGS. 14 and 15. Heat pipes 46 are structurally and functionally equivalent. Each heat pipe 46 includes a heat pipe portion 48 that removes and/or adds heat to capacitor 44, a metallic cylindrical flange 53 extending from the fixed end of heat pipe portion, and a metallic mounting portion 50 in the form of a threaded stud extending from the flange 53. Stud 50 and flange 53 may be integrated with heat pipe portion 48 or those components may be fixed together by a thermally conductive epoxy, for example. Flange 53 may include holes 51, as shown in FIG. 15, for fastening heat pipe 46 to the capacitor or another component, such as a heat sink or an electrical termination.

In an assembled form of capacitor 44, flange 53 is either positioned on or mounted to one of plates 20 or 22, heat pipe portion 48 extends within capacitor body, and stud 50 extends out of the capacitor body in a direction away from the plate 20 or 22.

Mounting portion 50 serves as an electrical termination, a thermal conductor and a mechanical connector. Mounting portion 50 may be connected to an electrical connection, a heat sink, and/or a temperature sensor, for example. The mounting portion 50 may be a threaded stud, as shown, a lead wire, lug, bushing, solder, braze, bolt down or any other means of electrical and thermal connection. More particularly, mounting portion 50 of a heat pipe may be provided with male threads as shown in FIGS. 4, 13B and 14. Alternatively, the mounting portion may include female threads as shown in FIG. 13C, or a lug connector as shown in FIG. 13D. As another alternative, mounting portion 50 may be omitted entirely from heat pipe 46, as shown in FIGS. 9-11. The mounting portion may also be provided without a flange, as shown in FIG. 13A.

Figure 5:
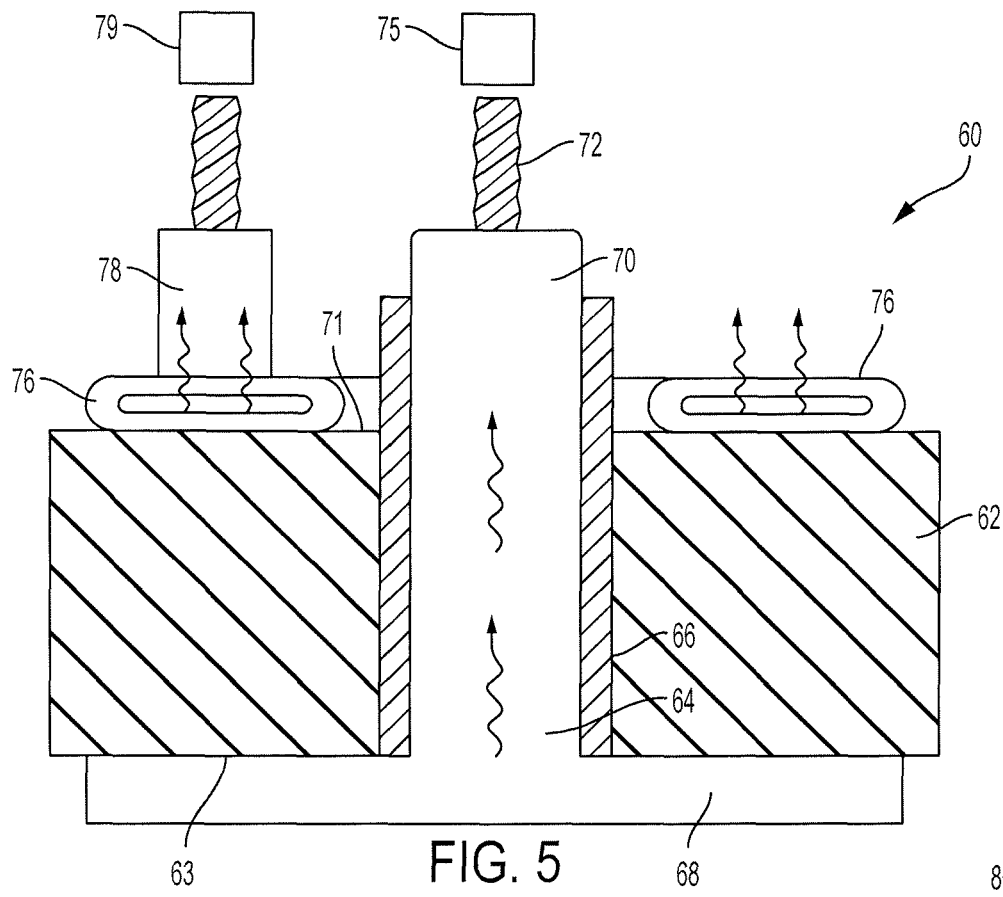
FIG. 5 depicts a schematic, cross-sectional view of a heat pipe cooled capacitor according to a fifth example of the invention.

FIG. 5 depicts a schematic, cross-sectional view of a heat pipe cooled capacitor 60 according to a fifth example of the invention. Capacitor 60 is similar to capacitor 44 and the differences between those embodiments will be explained. A heat pipe 64 is positioned within an electrically insulative tube 66, and they are both positioned within an opening formed in the center of capacitor body 62. Heat pipe 64 includes a cylindrical flange portion 68 that is brazed, soldered, welded, or otherwise connected to the bottom end 63 of body 62 such that flange portion 68 is electrically connected to bottom end 63 of body 62.

Flange 68 of heat pipe 64 may be composed of an electrical and thermally conductive material, such as copper. Alternatively, flange 68 may be an electrical and thermally conductive flat heat pipe, like heat pipe 76. If flange 68 is a flat heat pipe, then it may be integrated with vertical heat pipe portion 70 to form a single flow channel for the phase change material.

The vertical heat pipe portion 70 extends upward from flange portion 68 to an elevation above top end 71 of body 62. Heat pipe portion 70 is a traditional heat pipe containing phase change material. The cross-section of heat pipe portion 70 be circular or it may vary. Portions 68 and 70 may be integrated to form a single heat pipe, as mentioned above, or those components may be electrically and mechanically connected by braze, weld, epoxy or solder, for example.

Vertical heat pipe portion 70 has an electrical terminal 72, in the form of a threaded stud, on its free end for connection to an element 75 (shown schematically), such as an electrical termination, a heat sink and/or a temperature sensor, for example. Electrical terminal 72 conducts both heat and electrical current. Electrical terminal 72 may be either attached to or directly incorporated into heat pipe portion 70. Electrical terminal 72 could take the form of a post, plug or bushing, for example, or any other electromechanical connection means that is known to those of ordinary skill in the art.

The vertical heat pipe portion 70 and tube 66 extend to an elevation above the top end 71 of body 62, and electrical terminal 72 extends to an elevation above the free end of tube 66.

A second heat pipe 76 is electrically connected to body 62 and is positioned on top end 71 of body 62. The heat pipe 76 has a flattened cross-section to facilitate heat transfer between top end 71 of body 62 and heat pipe 76. As shown in FIG. 5, heat pipe 76 has an internal channel in which phase change material flows. Heat pipe 76 is mechanically connected to top end 71 of body 62 by braze, weld, epoxy or solder, for example.

An electrical terminal 78, in the form of a threaded stud, is electrically and thermally connected to the top surface of heat pipe 76. Terminal 78 conducts both heat and electrical current, and it may be attached to an element 79 (shown schematically), such as an electrical connection, a heat sink, and/or a temperature sensor, for example.

Electrical terminal 78 may be attached to the top end of heat pipe 76 using a thermally conductive epoxy, braze, weld, or solder, for example, or it may be directly incorporated into heat pipe 76. Although electrical terminal 78 takes the form of a threaded stud it could also take the form of a post, plug or bushing, for example, or any other electromechanical connection means that is known to those of ordinary skill in the art.

As another alternative, electrical terminal 78 may be connected directly to the top end 71 of body 62 in lieu of being connected to heat pipe 76.

It should be understood that terminals 78 and 72 are electrically isolated from eachother. Insulative tube 66 electrically isolates the bottom end 63 of body 62 from top end 71 of body 62. Tube 66 may be thermally conductive to transfer heat between body 62 and heat pipe portion 70.

In operation, heat from capacitor 60 is transferred away from body 62 by heat pipe 76 and heat pipe 64 (via thermally conductive tube 66), and heat is then carried away from heat pipes 76 and 64 by the elements that are connected to terminals 72 and 78. See the arrows in FIG. 5. Electrical current is transmitted through terminals 72 and 78.

Figure 6:
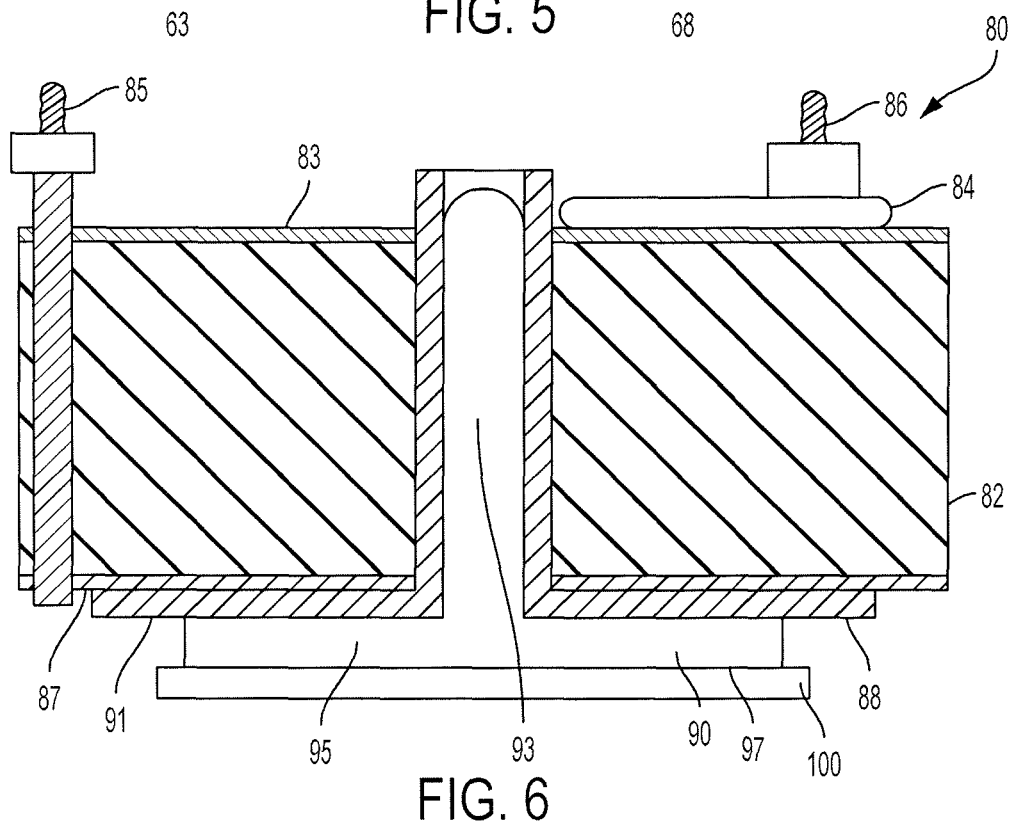
FIG. 6 depicts a schematic, cross-sectional view of a heat pipe cooled capacitor according to a sixth example of the invention.

FIG. 6 depicts a schematic, cross-sectional view of a heat pipe cooled capacitor 80 according to a sixth example of the invention. Capacitor 80 is substantially similar to capacitor 60 and the primary differences between those capacitors will be described hereinafter.

Capacitor 80 generally includes a capacitor body 82. A flat heat pipe 84 having a flattened surface, which is similar to heat pipe 76, is fixedly positioned on top end 83 of body 82, and it is also electrically and thermally connected to top end 83 of body 82. An electrical terminal 86, which is similar to electrical terminal 78, is electrically and thermally connected to the top surface of flat heat pipe 84.

Another electrical terminal 85 is positioned through another opening provided in capacitor body 82. Electrical terminal 85 includes a first end that is electrically connected to bottom end 87 of the capacitor body, and electrical terminal 85 includes a second, opposite end that is positioned at an elevation above the top end 83 of capacitor body 82 such that the second end of electrical terminal 85 and electrical terminal 86 are positioned on the same top side of capacitor body 82.

Electrical terminal 85 could be provided on bottom end 87 of body 82 without departing from the scope or spirit of the invention. It should be understood that electrical terminals 85 and 86 are electrically isolated from one another.

A thermally conductive and electrically insulative bushing 88 is positioned through a central opening in body 82 to provide a heat exchange pathway between body 62 and a second heat pipe 90. Detailed views of heat pipe 90 are shown in FIGS. 9-11. Bushing 88 includes a cylindrical flange 91 that extends from a vertical segment 94 and is sandwiched between the lower portion of heat pipe 90 and bottom end 87 of body 82.

Heat pipe 90 includes a vertical portion 93 that extends from a cylindrical flange 95. Vertical portion 93 includes a channel in which a phase change material is contained, whereas flange 95 may or may not include a channel in which the phase change material is contained. More particularly, flange 95 may be integrated with vertical portion 93 so as to form a T-shaped heat pipe channel, or flange 95 may be a conductive plate that is fixed to vertical portion 93 by a thermally conductive epoxy, weld, solder, or braze, for example.

The topside of flange 95 is positioned in direct thermal contact with the thermally conductive flange 91 of bushing 88, and the bottom side of flange 95 may be in direct thermal contact with a heat sink 100. The outer circumference of vertical portion 93 is positioned in direct thermal contact with the revolved interior surface of vertical portion 94 of bushing 88. Unlike heat pipe 64 of FIG. 5, heat pipe 90 of FIG. 6 does not include an electrical terminal.

In operation, heat from capacitor 80 is transferred away from body 82 by heat pipe 84, and heat is then carried away from heat pipe 84 by the element (not shown) connected to terminal 86. Heat from capacitor 80 is also transferred away from body 82 by heat pipe 90 via thermally conductive bushing 88, and heat is then carried away from heat pipe 90 by heat sink 100. Electrical current is transmitted through terminals 85 and 86.

It is to be understood that the invention is not limited to the details shown. Rather, various modifications may be made in the details within the scope and range of equivalents of the claims and without departing from the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A heat pipe cooled capacitor comprising:
   a capacitor body having opposing first and second ends and an opening defined between the opposing ends;
   a first heat pipe that is thermally and electrically connected to the first end of the capacitor body, and
   a second heat pipe positioned at least partially through the opening of the capacitor body, the second heat pipe being thermally connected to the second end of the capacitor body, the second heat pipe being electrically isolated from the first heat pipe.

2. The heat pipe cooled capacitor of claim 1 further comprising a first electrical terminal that is thermally and electrically connected to the first heat pipe.

3. The heat pipe cooled capacitor of claim 2, wherein the first heat pipe includes a first flat side that is positioned against said first end of the capacitor body, a second flat side upon which the first electrical terminal is thermally and electrically connected, and a hollow interior region which contains phase change material.

4. The heat pipe cooled capacitor of claim 2 further comprising a second electrical terminal that is thermally and electrically connected to the second end of the capacitor body.

5. The heat pipe cooled capacitor of claim 2, wherein the second heat pipe includes a flat portion positioned either against or adjacent the second end of the capacitor body, a vertical portion extending through the opening of the capacitor body, and a hollow interior region disposed in at least the vertical portion which contains phase change material.

6. The heat pipe cooled capacitor of claim 5, wherein the second heat pipe includes a second electrical terminal at a free end of the vertical portion.

7. The heat pipe cooled capacitor of claim 6, wherein the first and second electrical terminals are positioned adjacent the first end of the capacitor body.

8. The heat pipe cooled capacitor of claim 5 further comprising a sleeve positioned around the vertical portion of the second heat pipe that extends through the opening, the sleeve electrically isolating the second heat pipe from the first end of the capacitor body.

9. The heat pipe cooled capacitor of claim 8, wherein the sleeve includes a flange portion that is positioned between the flat portion of the second heat pipe and the second end of the capacitor body for electrically isolating the second heat pipe from the second end of the capacitor body.

10. The heat pipe cooled capacitor of claim 8, wherein the sleeve is thermally conductive such that it conducts heat between the capacitor body and the second heat pipe.

11. The heat pipe cooled capacitor of claim 1, wherein the second heat pipe is electrically connected to the second end of the capacitor body.

12. The heat pipe cooled capacitor of claim 1, wherein the second heat pipe is electrically isolated from the second end of the capacitor body by a sleeve that is positioned between the second end of the capacitor body and the second heat pipe.

13. The heat pipe cooled capacitor of claim 12, further comprising a first electrical terminal that is thermally and electrically connected to the first heat pipe, and a second electrical terminal that is electrically connected to the second side of the capacitor body.

14. The heat pipe cooled capacitor of claim 13, wherein the second electrical terminal is positioned through another opening that is defined in the capacitor body and extends to an elevation above the first end of the capacitor body.

15. A heat pipe cooled capacitor comprising:
   a capacitor body having opposing first and second ends and an opening defined between the opposing ends;
   a first heat pipe that is thermally and electrically connected to the first end of the capacitor body,
   a first electrical terminal that is thermally and electrically connected to the first heat pipe,
   a second heat pipe positioned at least partially through the opening of the capacitor body, the second heat pipe being thermally and electrically connected to the second end of the capacitor body, and
   a second electrical terminal that is thermally and electrically connected to the second heat pipe.

16. The heat pipe cooled capacitor of claim 15, wherein the second heat pipe includes a flat portion positioned against the second end of the capacitor body, a vertical portion extending through the opening of the capacitor body, and a hollow interior region disposed in at least the vertical portion which contains phase change material.

17. The heat pipe cooled capacitor of claim 16, wherein the second heat pipe is electrically isolated from the first heat pipe and the first end of the capacitor body by a sleeve that is positioned around the vertical portion of the second heat pipe.

18. A heat pipe cooled capacitor comprising:
- a capacitor body having opposing first and second ends and an opening defined between the opposing ends;
- a first heat pipe that is thermally and electrically connected to the first end of the capacitor body,
- a first electrical terminal that is thermally and electrically connected to the first heat pipe,
- a second electrical terminal that is electrically connected to the second end of the capacitor body,
- a second heat pipe positioned at least partially through the opening of the capacitor body, the second heat pipe being thermally connected to the second end of the capacitor body and electrically isolated from the first electrical terminal and the second electrical terminal.

19. The heat pipe cooled capacitor of claim 18, wherein the second electrical terminal is positioned through another opening in the capacitor body.

20. The heat pipe cooled capacitor of claim 19, wherein the second electrical terminal includes a first end that is electrically connected to the second end of the capacitor body, and the second electrical terminal includes a second end that is positioned at an elevation above the first end of the capacitor body such that the second end of the second electrical terminal and the first electrical terminal are positioned on the same side of the capacitor body.

* * * * *